Feb. 16, 1926.
C. R. NICHOLS
1,573,568
METHOD OF IMPREGNATING CEMENTITIOUS PRODUCTS
Filed Nov. 23, 1925
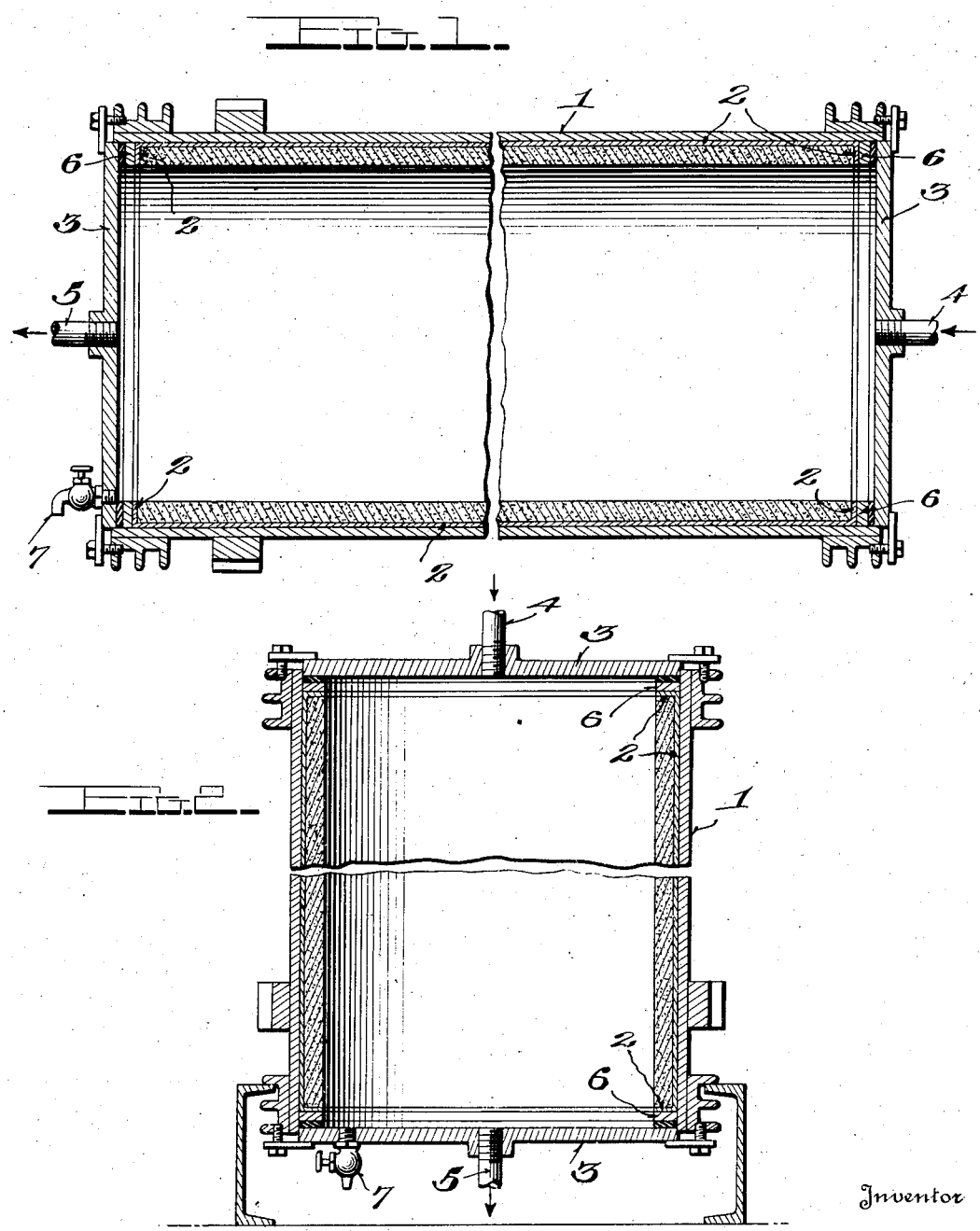
Inventor
C. R. Nichols,
By
Attorney Patented Feb. 16, 1926.

1,573,568

UNITED STATES PATENT OFFICE.

CLIFFORD R. NICHOLS, OF DETROIT, MICHIGAN.

METHOD OF IMPREGNATING CEMENTITIOUS PRODUCTS.

Application filed November 23, 1925. Serial No. 71,009.

*To all whom it may concern:*

Be it known that I, CLIFFORD R. NICHOLS, a citizen of the United States, residing at Detroit, in the county of Wayne and State of Michigan, have invented certain new and useful Improvements in Methods of Impregnating Cementitious Products, of which the following is a specification.

This invention relates to a method of impregnating cementitious products the present application being in substitution, and continuation in part, of an application filed Aug. 21, 1925, Serial No. 51,679.

In my Patent No. 1,457,185, dated May 29, 1923, there is disclosed a process of making hollow ware which consists in rotating the plastic material against a confining surface coated with fusible material and thereafter injecting steam into the product to cure the latter and to melt the fusible material so as to permit the product to be removed. The fusible material is recited as paraffine or wax. In this patent the sole recited and intended function of the fusible material was to permit removal of the product. It was later discovered that the fusible material, owing to its wax nature impregnated the product and rendered same impervious to attack in accordance with the properties of wax, or paraffine. However, this discovery of unintentional impregnation was found to be lacking in uniformity in the product and correspondingly of no value where impregnation was a desideratum. Through experiment and tests, I have discovered that there are a number of factors which must be taken into consideration, in order to provide an effective and uniform impregnation, so that the latter will be of any commercial or practical utility.

The present invention, therefore, aims to devise a method whereby cementitious products may be uniformly impregnated with a fusible material which renders the product resistant to penetration by water or attack by injurious alkalies, acids, water, moisture or other liquids or substances.

In the drawings:—

Fig. 1 is a longitudinal sectional view of a horizontal type of apparatus by which the invention may be practiced, and Fig. 2 is a similar view of a vertical type of apparatus.

In proceeding in accordance with the present invention, a one-piece form 1, or one having liquid-sealed joints is provided. A lining 2 of fusible material of desired thickness, such as parafine or wax is applied to the inner circumference of the form and to the end forming members or rings 6, whereupon the plastic cementitious mass is then introduced and rotated against the lining by centrifugal force resultant from rotation of the mold. After molding of the product, bulk-heads 3 are applied to the mold or form so as to seal the latter, whereupon steam is admitted to the interior of the hollow product through an inlet 4 for example and egresses through an outlet 5. Cocks 7 are provided to drain the melted fusible material from the forms as desired or found necessary.

I have discovered that in order to obtain an effective or uniform impregnation of the product it is essential to definitely observe or ascertain, first the water content of the plastic mass and physical characteristics of the mass or agglomerate and to then govern the amount, pressure and temperature of steam admitted into contact with the molded product, and to still further control the duration or period of time throughout which the admitted steam is permitted to remain in contact with the product.

For example, it is important to have concrete pipe and the like impervious to acids, alkalies and other injuries elements, and while by practicing my invention this may be accomplished, a result is obtained of even greater advantage.

Concrete bodies swell and shrink as they absorb or take up moisture and this alternate swelling and shrinking causes checking and cracking of the surface and even breaks the bond between the body and the reinforcements therein. It is therefore of great importance, to have concrete bodies impervious to the extrusion or absorption of moisture.

I have discovered this may be accomplished by forming centrifugally, densified bodies of a cementitious plastic mass, the water content of which is known and during the curing of the body with steam, cause an agent such as paraffine or heavy fusible wax to be vaporized and commingled with the steam and driven into the body by pressure and heat.

The penetration of the body by the fused impregnating material, and the regulation and control thereof depends directly on several elements and their proper coordination. Should the body be formed of material bearing a high water ratio the interstices with the body are filled with water, whereupon heat or other hydrating element must be applied to cause evaporation of the water and the opening of the interstices of the body to permit entry thereinto of the steam. On the other hand should the body be comparatively dry the steam may readily penetrate the body carrying with it heat, moisture and the vapors and fine particles of fusible material.

It is also known that concrete in its early stages is easily burned and this may be done at temperatures not above the boiling point of water at a pressure of one atmosphere and as pressures are increased higher temperatures are necessary to convert water into steam. It follows then that steam with a normal degree of saturation is hotter under the higher pressures.

It being requisite to cure the body under temperatures which will not cause burning it is necessary to add water to the steam as the curing pressure is increased to supply the required moisture for hydration and maintain the temperature below the burning point of the body.

In operation the mold and each conforming member or end ring, are lined with a material which will fuse at a desired temperature, whereupon the body is cast thereagainst of plastic cementitious material having only the desired amount of water content. The body is densified by the action of centrifugal force in the rotating mold. Steam is then introduced into the mold and as the temperature is gradually increased the mold lining is fused first at the end forming member and as the steam comes in contact therewith, the entire lining is broken down thus allowing the steam and vapors of fusible material to freely circulate about the entire surfaces of the body. Upon such entry of the steam into the product, same melts the fusible material, thus leaving free space in places formerly occupied by the fusible material, i. e., at the ends of the product and about the periphery thereof. These spaces enable the steam and therewith the fusible material to freely circulate not only throughout the length of the product, but also across the ends of and both on the inner circumference or interior of the product and also on the periphery and exterior thereof. Thus impregnation of both the inner circumference and periphery of the product is effected so as to render each resistant to attack and to also confine or prevent escape of the moisture in the cementitious matter forming the walls of the product. The fine particles and vapors of the fusible material become intimately intermixed with and are carried by the steam about the entire surfaces of and into the pores and interstices of the body. When the body cools the fusible material solidifies thus effectively sealing the body against the escape of its moisture content or the penetration of the body by external moisture.

It will be readily understood by those in the art that by using a fusible material which is resistant to ground acids, salts, alkalies or the like the body will be protected against their harmful actions.

Any fusible material may be used which possesses the properties of being broken up into fine particles and vapors at temperatures lower than that used to effect curing of the body.

It will also be understood that as the water content or density of the mass varies the degree of heat and pressure, as well as the length of time required to effect the desired penetration of the body varies. Other variations may be required as the physical characteristics of the fusible material varies.

What is claimed is:—

1. The hereindescribed method of impregnating cementitious products, which resides in first determining the water content of the plastic material and the physical characteristics thereof, then rotating the plastic material against a confining surface coated with fusible material, and finally subjecting the interior of the molded product to a fluid heated to a predetermined degree of temperature throughout a period of time to effect melting of the fusible material and uniform impregnation of the product by the fusible material.

2. The hereindescribed method of impregnating cementitious products which resides in rotating a body of plastic material against a confining surface coated with fusible material, and then in subjecting the product and fusible material to the action of a fluid of such temperature and pressure and throughout a period of time to effect melting of the fusible material and uniform impregnation of the product by the fusible material.

3. The hereindescribed method of impregnating hollow cementitious products, which consists in coating the inner face and the ends of a confining surface having the form to be given the product, with fusible impregnating material, then in introducing and centrifugally molding a plastic mass against the surface and ends of the fusible material, then in introducing a heated fluid into the interior of the product to thereby melt the fusible material and maintaining circulation of the fluid so as to cause same to cure the product and at the same time to flow the melted fusible material about the inner circumference, across the ends and about the periphery of the product thereby to coat the latter both on its inner and outer faces.

4. The hereindescribed method of impregnating hollow cementitious products, which consists in molding the product, and then in flowing melted impregnating material about the inner circumference and the periphery of the product so as to coat the latter both on its interior and exterior.

5. The hereindescribed method of impregnating hollow cementitious products, which consists in molding the product, and then in maintaining a forced circulation of melted impregnating material about the inner circumference across the ends and about the periphery of the product so as to coat the latter both interiorly and exteriorly.

6. The process of forming hollow bodies of plastic cementitious material consisting of bringing the aggregate to a predetermined degree of saturation, centrifugally solidifying the mass to a predetermined density against a mold coated with a fusible material, fusing the mold lining and applying a predetermined pressure and degree of heat thereto to cure and impregnate the body.

In testimony whereof I affix my signature.

CLIFFORD R. NICHOLS.